US008886802B1

(12) United States Patent
Jonkman et al.

(10) Patent No.: US 8,886,802 B1
(45) Date of Patent: Nov. 11, 2014

(54) TRANSPORT AGNOSTIC NETWORK ACCESS CONTROL

(75) Inventors: Roelof Jonkman, Half Moon Bay, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1297 days.

(21) Appl. No.: 12/409,134

(22) Filed: Mar. 23, 2009

(51) Int. Cl.
*G06F 15/173* (2006.01)
*G06F 15/16* (2006.01)

(52) U.S. Cl.
USPC ............................ 709/225; 709/226; 709/230

(58) Field of Classification Search
USPC ................................................. 709/225–230
See application file for complete search history.

(56) References Cited

U.S. PATENT DOCUMENTS

| | | | | |
|---|---|---|---|---|
| 7,912,973 | B2* | 3/2011 | Feingold et al. | 709/230 |
| 8,006,089 | B2* | 8/2011 | Ohba | 709/225 |
| 8,205,238 | B2* | 6/2012 | Blumenthal et al. | 713/164 |
| 2006/0133405 | A1* | 6/2006 | Fee | 370/437 |
| 2008/0013533 | A1* | 1/2008 | Bogineni et al. | 370/389 |
| 2008/0049648 | A1* | 2/2008 | Liu et al. | 370/310 |
| 2008/0062926 | A1* | 3/2008 | Oba | 370/331 |
| 2010/0190439 | A1* | 7/2010 | Huang et al. | 709/204 |

OTHER PUBLICATIONS

Forsberg, D. et al.; "Protocol for Carrying Authentication for Network Access (PANA)"; Sep. 6, 2007; http://tools.ietf.org/html/draft-ietf-pana-pana-18.

Parthasarathy, M.; "PANA Enabling IPsec based Access Control"; Jul. 2005; http://tools.ietf.org/html/draft-ietf-pana-ipsec-07.
Jayaraman, P. et al.; "Protocol for Carrying Authentication for Network Access (PANA) Framework"; Sep. 6, 2007; http://tools.ietf.org/html/draft-ietf-pana-framework-10.
Fajardo et al; "State Machines for Protocol for Carrying Authentication for Network Access(PANA)"; Oct. 1, 2007; http://tools.ietf.org/html/draft-ietf-pana-statemachine-06.
Ohba, Y.; "Pre-authentication Support for PANA"; Nov. 18, 2007; http://tools.ietf.org/html/draft-ietf-pana-preauth-02.
Parthasarathy, M.; "Protocol for Carrying Authentication and Network Access (PANA) Threat Analysis and Security Requitrements"; Mar. 2005; http://www.ietf.org/rfc/rfc4016.txt.
Yegin, A. et al.; "Protocol for Carrying Authentication for Network Access (PANA) Requirements"; May 2005; http://www.ietf.org/rfc/rfc4058.txt.
Paglisusi, Paulo et al.; "PANA/GSM Authentication for Internet Access"; Aug. 16, 2003; Information Security Group; United Kingdom; http://www.fuchsbergernet/~cjm/pgafia2.pdf.

* cited by examiner

*Primary Examiner* — Minh-Chau Nguyen
(74) *Attorney, Agent, or Firm* — ALG Intellectual Property, LLC

(57) ABSTRACT

A computer-implemented method may include assigning a transport-agnostic identifier to a computing device. The computer-implemented method may include identifying a first attempt by the computing device to access a first network. The first attempt may be made via a first media-transport technology that identifies the computing device with a first transport-specific identifier. The computer-implemented method may also include receiving the transport-agnostic identifier from the computing device. The computer-implemented method may further include using the transport-agnostic identifier, instead of the first transport-specific identifier, to determine whether to allow the computing device to access the first network. Various other methods, systems, and computer-readable media are also disclosed.

20 Claims, 6 Drawing Sheets

TRANSPORT AGNOSTIC NETWORK ACCESS CONTROL

BACKGROUND

The managed state of an organization's individual endpoints may play a critical role in the overall security and availability of its Information Technology (IT) infrastructure and related business operations. The new wave of sophisticated crimeware not only targets specific companies, but may also target desktops and laptops as backdoor entryways into those enterprises' business operations and valuable resources. To safeguard themselves against these targeted threats, organizations must have a means to guarantee that each endpoint continually complies with corporate security and configuration management policies. Failure to guarantee endpoint policy compliance may leave organizations vulnerable to a wide array of threats. These threats may include the proliferation of malicious code throughout the enterprise, disruption of business-critical services, increased IT recovery and management costs, exposure of confidential information, damage to corporate brand, and/or regulatory fines due to non-compliance.

Network-access-control technologies may enable organizations to ensure the proper configuration and security state of user endpoints—including those of on-site employees, remote employees, guests, contractors, and temporary workers—before they are allowed to access resources on the corporate network. Network-access-control technologies may also discover and evaluate endpoint compliance status, provision the appropriate network access, and provide for mediation capabilities to ensure that endpoint security policies and standards are met.

Traditional network-access-control technologies may use transport-specific identifiers, such as Internet Protocol (IP) addresses, to identify and monitor endpoints. Unfortunately, controlling endpoint access using transport-specific identifiers may be problematic when an endpoint uses multiple different media-transport technologies. A media-specific identifier that identifies the endpoint when the endpoint uses one media-transport technology may not be available when the endpoint uses a different media-transport technology. As an example, an endpoint may typically use an Ethernet connection to connect to a network. The network may determine that the endpoint is infected with malware and may include an IP address associated with the endpoint on a blacklist. However, if the endpoint attempts to connect to the network by tethering through a cellular phone, the network may not be able to identify the endpoint as a blacklisted endpoint

SUMMARY

The present disclosure is directed to methods and systems for providing transport-agnostic network access control. In some embodiments, transport-agnostic identifiers may be provisioned to endpoint computing devices. The transport-agnostic identifiers, rather than transport-specific identifiers, may be used to provide network access control. For example, a control module may assign a transport-agnostic identifier to a computing device. The control module may identify a first attempt by the computing device to access a first network. The computing device may attempt to access the first network via a first media-transport technology, and the first media-transport technology may identify the computing device with a first transport-specific identifier. The control module may receive the transport-agnostic identifier from the computing device and may use the transport-agnostic identifier, instead of the first transport-specific identifier, to determine whether to allow the computing device to access the first network. For example, the control module may determine whether the transport-agnostic identifier is on a black list or a white list.

In some embodiments, the control module may identify a second attempt by the computing device to access the first network. The second attempt may be made via a second media-transport technology, and the second media-transport technology may identify the computing device with a second transport-specific identifier. The control module may receive the transport-agnostic identifier from the computing device as part of the second attempt to access the first network and may use the transport-agnostic identifier, instead of the second transport-specific identifier, to determine whether to allow the computing device to access the first network.

In some embodiments, access-control information associated with the transport-agnostic identifier may be received from the first network and distributed to a second network. In various embodiments, the transport-agnostic identifier may be assigned and sent to the computing device during an initiation process that is performed prior to allowing the computing device to access the first network. These and other embodiments will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
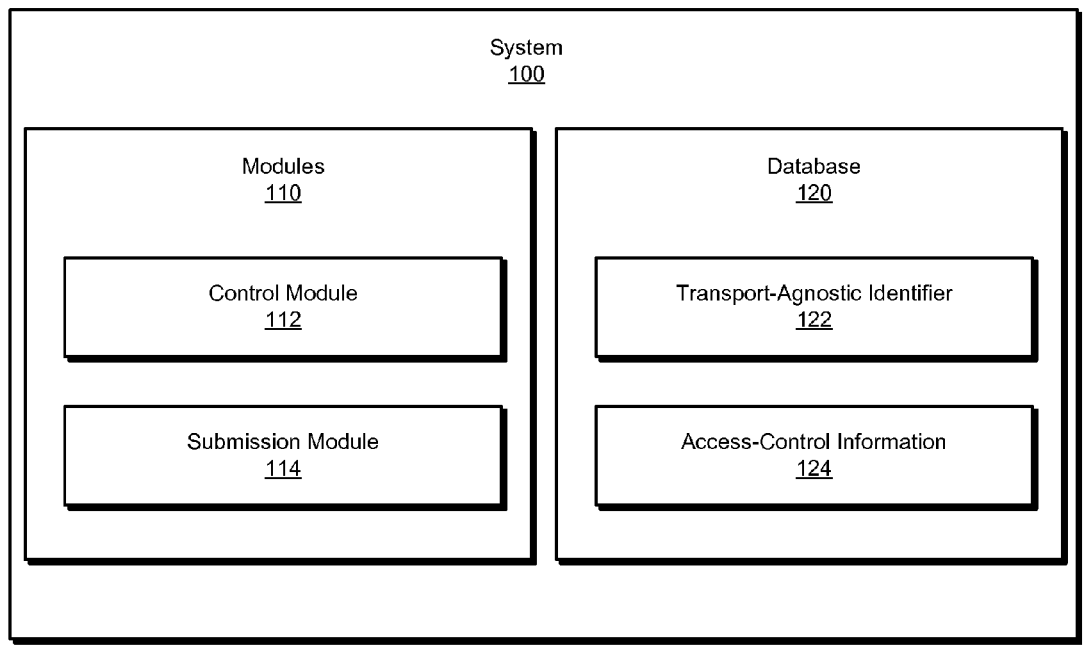
FIG. 1 is a block diagram of an exemplary system for providing transport-agnostic network access control according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the present disclosure provide various methods and systems for transport-agnostic network access control. For example, a control module may assign a transport-agnostic identifier to a computing device that may access a network. When the computing device attempts to access the network, the control module may use the transport-agnostic identifier to identify the computing device and determine whether to allow the computing device to access the network. The transport-agnostic identifier may enable the control module to identify and apply access control to the computing device regardless of the media-access technology the computing device uses to access the network.

Figure 2:
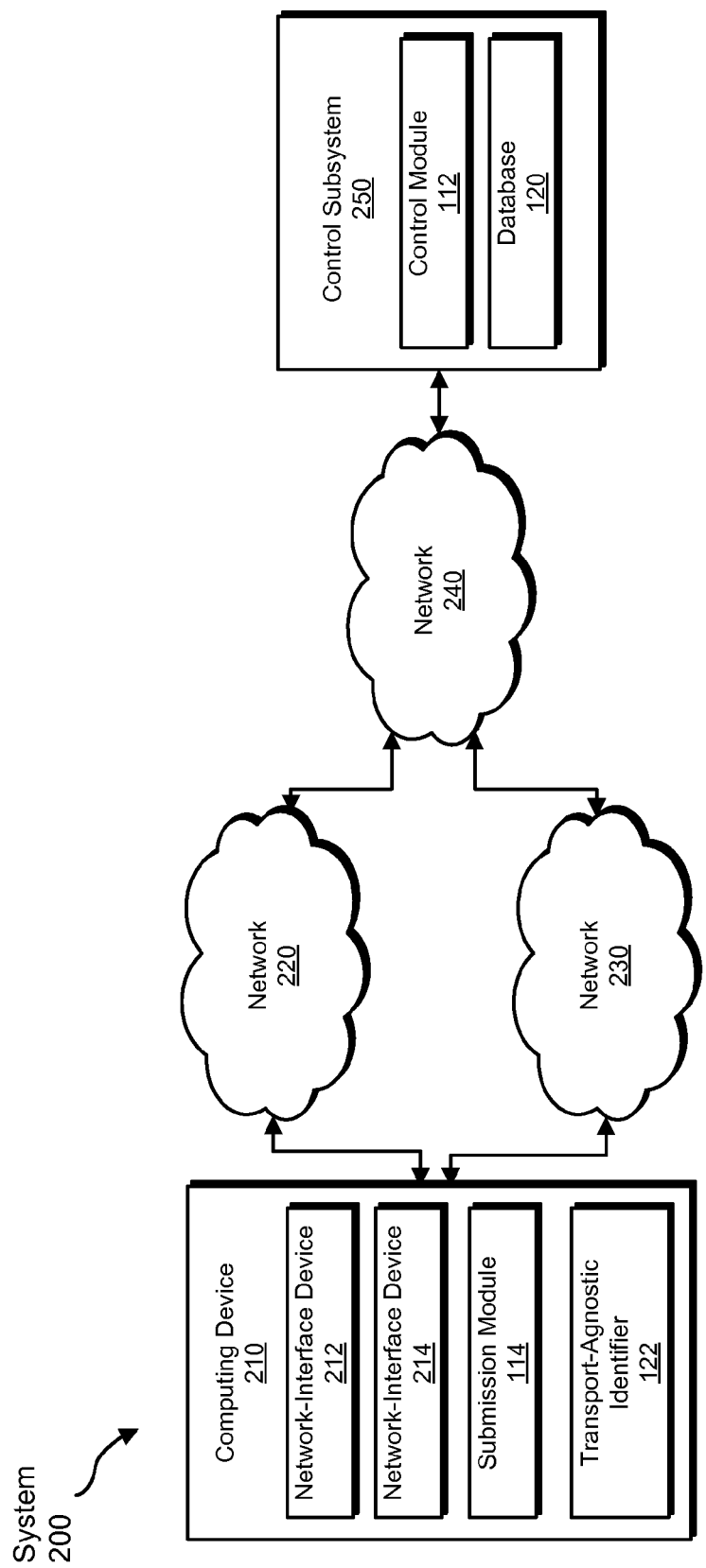
FIG. 2 is a block diagram of another exemplary system for providing transport-agnostic network access control according to certain embodiments.
Figure 3:
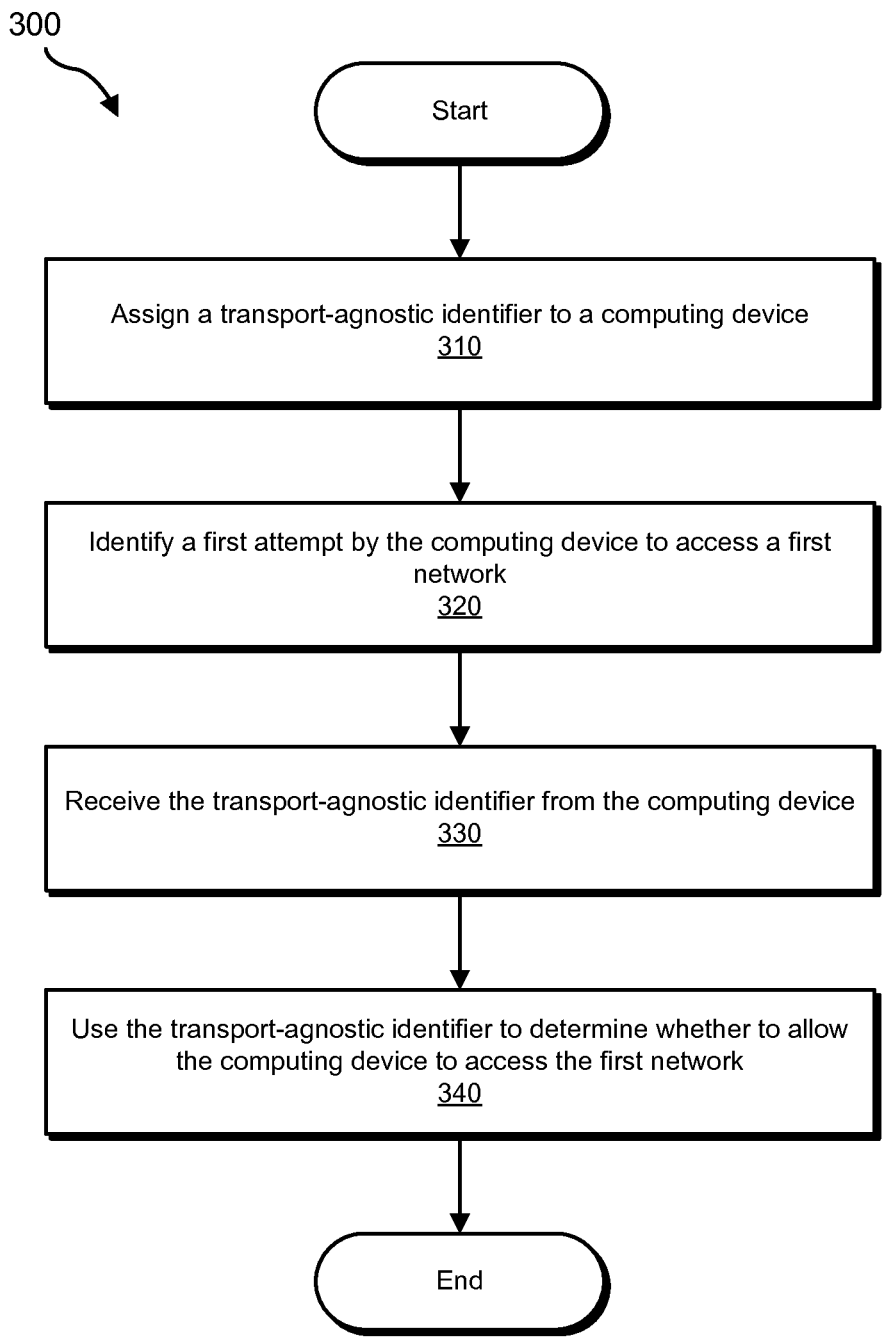
FIG. 3 is a flow diagram of an exemplary method for providing transport-agnostic network access control according to various embodiments.
Figure 4:
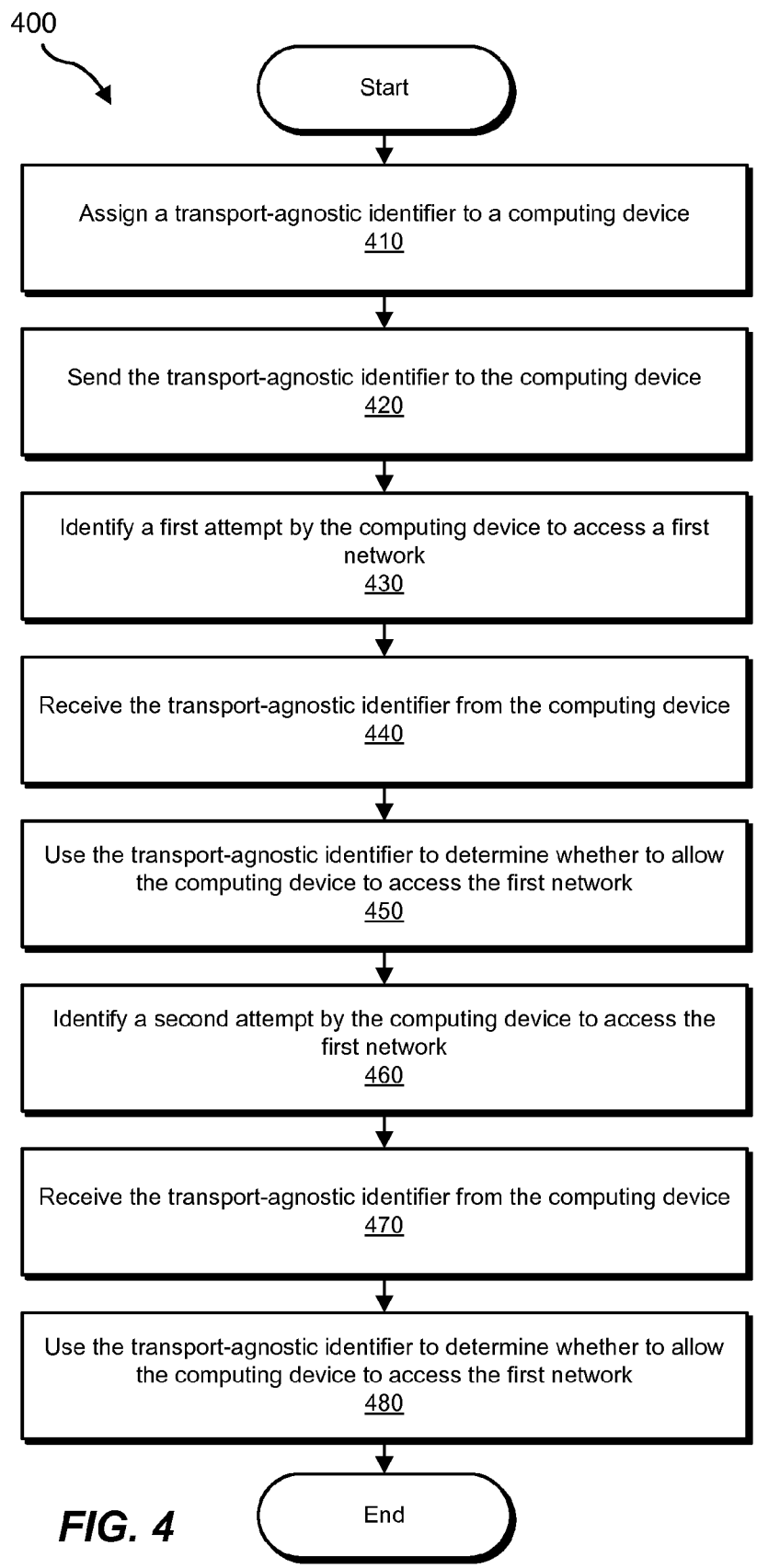
FIG. 4 is a flow diagram of another exemplary method for providing transport-agnostic network access control according to certain embodiments.
Figure 5:
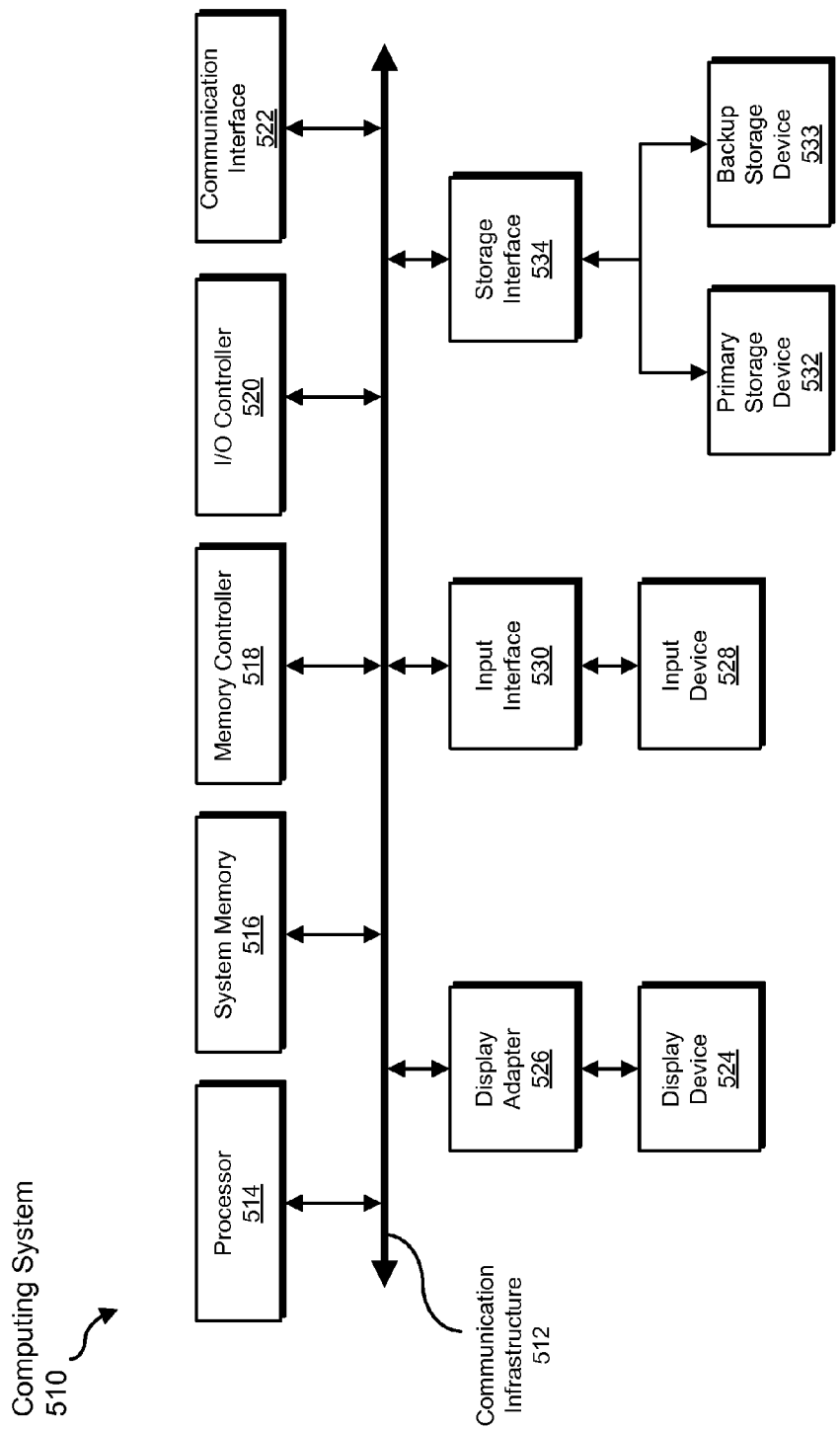
FIG. 5 is a block diagram of an exemplary computing system capable of implementing one or more of the embodiments described and/or illustrated herein.
Figure 6:
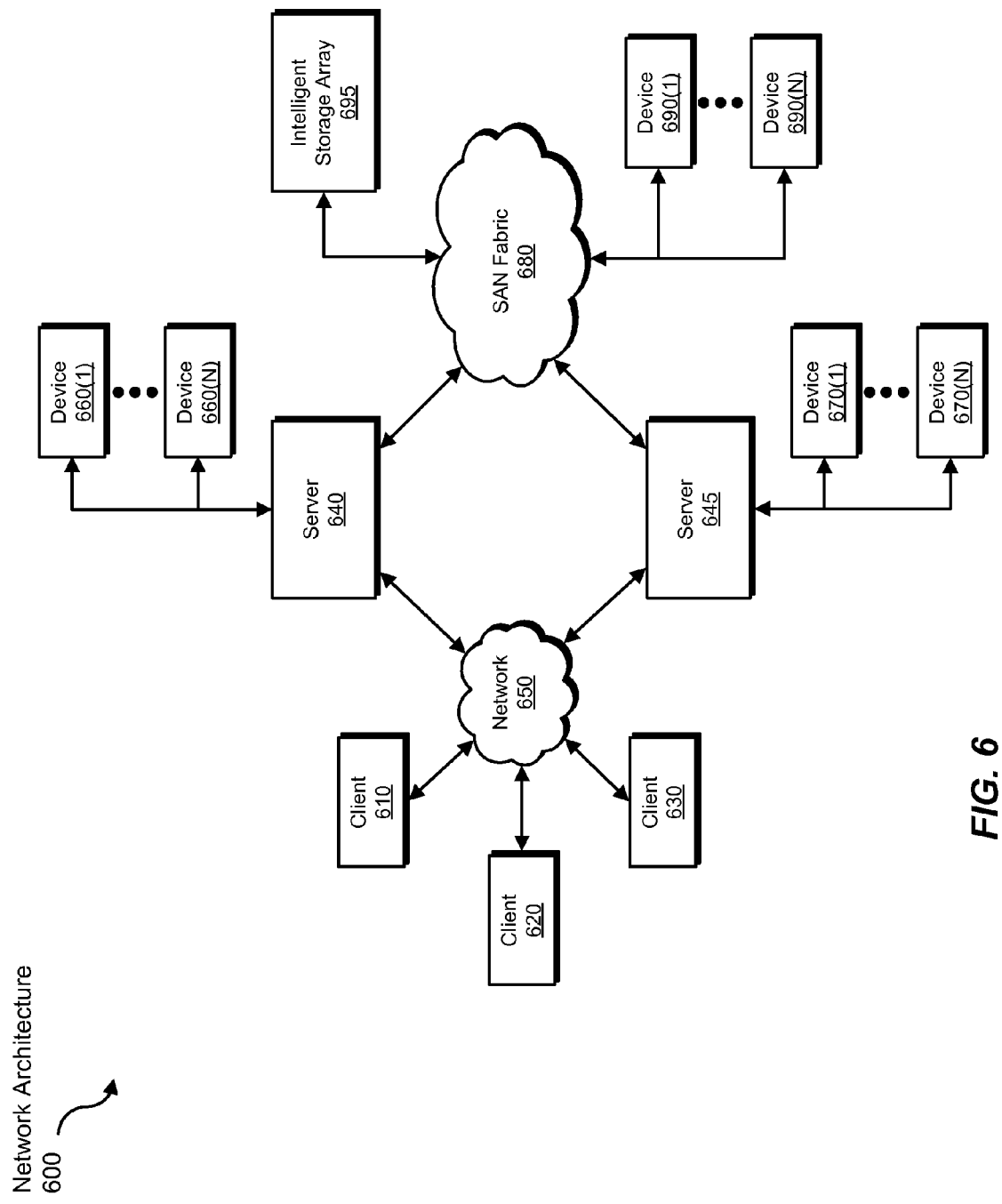
FIG. 6 is a block diagram of an exemplary computing network capable of implementing one or more of the embodiments described and/or illustrated herein.

FIGS. 1 and 2 illustrate systems for providing transport-agnostic network access control, and FIGS. 3 and 4 show methods that use one or more components of FIGS. 1 and 2 to provide network access control. FIGS. 5 and 6 illustrate an exemplary computing system and network architecture for implementing embodiments of the instant disclosure.

FIG. 1 illustrates an exemplary network-access-control computing system 100 for providing transport-agnostic network access control. System 100 may include modules 110 and a database 120. Modules 110 may include a control module 112 and a submission module 114. Control module 112 may be programmed to assign a transport-agnostic identifier to a computing device. Control module 112 may also be programmed to receive the transport-agnostic identifier from the computing device when the computing device is attempting to access a network, and control module 112 may use access-control information associated with the transport-agnostic identifier to determine whether to allow the computing device to access the network. Submission module 114 may be programmed to submit the transport-agnostic identifier to the control module during an attempt to access a network.

In certain embodiments, one or more of modules 110 in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as the computing system 510 in FIG. 5 and/or portions of exemplary network architecture 600 in FIG. 6. One or more of modules 110 in FIG. 1 may also represent all or portions of one or more special-purpose computers configured to perform one or more tasks associated with the steps disclosed herein.

As previously mentioned, system 100 may also include a database 120. Database 120 may store transport-agnostic identifiers, such as transport-agnostic identifier 122. Database 120 may also store access-control information, such as access-control information 124. Database 120 may associate transport-agnostic identifiers with access-control information.

Database 120 may represent a portion of one or more computing devices. Database 120 may represent a portion of computing system 510 in FIG. 5 and/or portions of exemplary network architecture 600 in FIG. 6. Database 120 may include any data structure capable of storing and/or organizing transport-agnostic identifiers and/or access-control information.

FIG. 2 is a block diagram of an exemplary system 200 for providing transport-agnostic network access control. Exemplary system 200 may include a computing device 210, a network 220, a network 230, a network 240, and a control subsystem 250. Computing device 210 may include a network-interface device 212, a network-interface device 214, submission module 114, and transport-agnostic identifier 122. Computing device 210 may include or be implemented as hardware, computing instructions (e.g., software), or a combination thereof. In some embodiments, computing device 210 may include a desktop computer, a laptop computer, a portable-computing device (e.g., a cellular telephone), a workstation, a server, and/or any other suitable computing device.

Network-interface device 212 and network-interface device 214 may include any suitable network interface hardware and/or software. For example, network-interface device 212 and/or network-interface device 214 may include a network card, a network adaptor, a network interface controller (NIC), a network interface card, and/or a Local Area Network (LAN) adaptor. Network-interface device 212 and/or network-interface device 214 may operate using any suitable media-transport technology. For example, network-interface device 212 and/or network-interface device 214 may use Ethernet technology, 802.11x technology, cellular technology, Universal Serial Bus (USB) technology, and/or Bluetooth technology.

In some embodiments, network-interface device 212 and network-interface device 214 may implement different media-transport technologies and may therefore access different networks when attempting to connect to an enterprise network or other protected network. For example, network-interface device 212 may attempt to connect to network 240 through network 220, and network-interface device 214 may attempt to connect to network 240 through network 230.

Networks 220, 230, and/or 240 may generally represent any medium or architecture capable of facilitating communications or data transfer. Networks 220, 230, 240 may include a LAN, a Metropolitan Area Network ("MAN"), a wide area network ("WAN"), an intranet, the Internet, a Voice over IP ("VoIP") network, an IP Multimedia Subsystem ("IMS") network, and/or a Public Land Mobile Network ("PLMN"). A PLMN may include a packet-switched mobile network, such as, for example, a General Packet Radio Service ("GPRS"), a Cellular Digital Packet Data ("CDPD") network, and/or a mobile IP network. Networks 220, 230, and/or 240 may include any suitable wired and/or wireless networks. Examples of wireless networks may include cellular networks, Personal Communications Service ("PCS") networks, Bluetooth networks, and/or Wi-Fi networks (i.e., IEEE 802.11 networks).

Control system 250 may control access to network 210. Control subsystem 250 may include any network hardware and/or software capable of providing network access control. For example, control subsystem 250 may include control module 112. In some embodiments, control subsystem 250 may include a gateway enforcer, a Dynamic Host Configuration Protocol ("DHCP") enforcer, a Network Access Protection ("NAP") enforcer, a LAN enforcer, and/or any other hardware and/or software for providing network access control.

FIG. 3 illustrates an exemplary method 300 for performing transport-agnostic network access control. The steps in FIG. 3 may be performed by one more components of system 100 and/or system 200. For example, control module 112 may assign transport-agnostic identifier 122 to computing device 210 (step 310). By assigning transport-agnostic identifier 122 to computing device 210, control module 112 may transform identification information for computing device 210 into transport-agnostic identifier 122. For example, when computing device 210 attempts to access network 240, computing device 210 may identify itself with transport-specific identifier 122. In response, control module 112 may create transport-agnostic identifier 122 for computing device 210, thereby transforming transport-specific identification for computing device 210 into transport-agnostic identification.

As noted, control module 112 may assign transport-agnostic identifier 122 to computing device 210 when computing device 210 attempts to access network 240. In some embodiments, control module 112 may assign transport-agnostic identifier 122 to computing device 210 during a registration process. Control module 112 may send transport-agnostic identifier 122 to computing device 210 during an initiation process that is performed prior to allowing computing device 210 to access the first network. Computing device 210 may store transport-agnostic identifier 122 in non-volatile memory so that it may be accessed later when computing device 210 attempts to access network 240.

As used herein, the phrase "transport-agnostic identifier" may refer to any identifier that may be used to identify a computing device regardless of the media-transport technology used by the computing device to access the network. In some embodiments, a transport-agnostic identifier may include a Globally Unique Identifier ("GUID"). A transport-agnostic identifier may also include any other suitable set of characters that uniquely identifies computing device 210.

Control module 112 may identify a first attempt by computing device 210 to access network 240 (step 320). The first attempt may be made via a first media-transport technology. For example, the first attempt may be made using network-interface device 212, which may use network 220 to attempt to access network 240. Network 240 may identify network-interface device 212 using a first transport-specific identifier. In other words, the first media-transport technology (i.e., the media-transport technology used by network-interface device 212 and network 220) may identify computing device 210 with the first transport-specific identifier.

As used herein, the phrase "transport-specific identifier" may refer to any identifier specific to a media-transport technology. For example, if network-interface device 212 is an Ethernet card, the first transport-specific identifier may include an Internet protocol (IP) address. Transport-specific identifiers may also include GSM addresses, USB device addresses, switch ports, link-layer addresses, and/or any other identifiers specific to a particular transport technology.

When computing device 210 attempts to access network 240, computing device 210 may send transport-agnostic identifier 122 to control subsystem 250, and control module 112 may receive transport-agnostic identifier 122 from computing device 210 (step 330). Submission module 114 may send transport-agnostic identifier 122 to control module 112. In some embodiments, computing device 210 may only be allowed to communicate with control module 112 before control module 112 determines whether computing device 210 is allowed to have additional access to network 240.

Control module 112 may use transport-agnostic identifier 122, instead of a transport-specific identifier, to determine whether to allow computing device 210 to access network 240 (step 340). Control module 112 may implement any suitable access-control process or algorithm to determine whether to allow computing device 210 to connect to network 240. For example, control module 112 may access database 120 to find access-control information 124 that is associated with transport-agnostic identifier 122. Access-control information 124 may indicate restrictions, permissions, and/or other access-control information about computing device 210. In some embodiments, control module 112 may search a white list and/or a black list for an entry that matches transport-agnostic identifier 122 to determine whether to allow computing device 210 to access the first network.

If control module 112 determines that computing device 210 is not allowed to access network 240, control module 112 may terminate network connectivity for computing device 210. Control module 112 may additionally or alternatively quarantine computing device 210. In other embodiments, control module 112 may limit access to network 240 and/or may attempt to remediate computing device 210. In some embodiments, control module 112 may send computing device 210 a notification indicating that connectivity to network 240 is limited or terminated. In some embodiments, control module 112 may provide an explanation for the restriction in the notification.

Control module 112 may restrict access rights for computing device 210 for one or more reasons. For example, computing device 210 may only be allowed to access network 240 if computing device 210 has the required antivirus software, antispyware software, and/or patches installed. Computing device 210 may be prohibited from accessing network 240 if computing device 210 is infected with malware or other software that may compromise network security.

FIG. 4 shows another exemplary method 400 for providing transport-agnostic network access control. The steps shown in FIG. 4 may be performed by any suitable computer-executable code and/or computing system. For example, control module 112 may assign transport-agnostic identifier 122 to computing device 210 (step 410). Control module 112 may then send transport-agnostic identifier 122 to computing device 210 (step 420). At a later point in time, control module 112 may identify a first attempt by computing device 210 to access network 240 (step 430). The attempt to access network 240 may refer to any attempt to connect to or utilize one or more resources of network 240.

Control module 112 may receive transport-agnostic identifier 122 from computing device 210 as part of the attempt to access network 240 (step 440). Control module 112 may use transport-agnostic identifier 122, instead of the transport-specific identifier, to determine whether to allow computing device 210 to access network 240 (step 450). Steps 410, 430, 440, and 450 are comparable to steps 310, 320, and 330, 340, respectively. Therefore, the description of steps 310, 320, and 330, 340 may also apply to steps 410, 430, 440, and 450.

In some embodiments, control module 112 may identify a second attempt by computing device 210 to access network 240 (step 460). The second attempt may be made via a second media-transport technology that identifies computing device 210 with a second transport-specific identifier. As part of the second attempt to access network 240, computing device 210 may send transport-agnostic identifier 122 to control module 112, and control module 112 may receive transport-agnostic identifier 122 from computing device 210 (step 470). Then, control module 112 may use transport-agnostic identifier 122, rather than the second transport-specific identifier, to determine whether to allow computing device 210 to access network 240 (step 480).

As an example of the process illustrated in FIG. 4, the first attempt may be made using network-interface device 212 over network 220, and the second attempt may be made using network-interface device 214 over network 230. Network-interface device 212 may include an Ethernet card, and network 220 may include a LAN. Network-interface device 214 may be a USB cable used for tethering to a laptop, and network 230 may be a cellular network. Thus, the first transport-specific identifier (i.e., the transport-specific identifier associated with network-interface device 212) may be different than the second transport-specific identifier (i.e., the transport-specific identifier associated with network-interface device 214). By using transport-agnostic identifier 122, rather than the first and second transport-specific identifiers, control module 112 may be able to identify computing device 210 whether computing device 210 uses network-interface device 212 or network-interface device 214 to access network 240.

While FIG. 4 illustrates an attempt to access network 240 using two different media-transport technologies, a computing device may have the capability to access a network using any number of network technologies. For example, a computing device may include an 802.11 wireless interface, a USB interface, a Bluetooth interface, a cellular network interface, and/or any other suitable network interface.

In some embodiments, network 240 may actively monitor the compliance of computing device 210. If, during an active connection, computing device 210 falls out of compliance, network 240 may limit or terminate connectivity for computing device 210. In such embodiments, network 240 may communicate with control module 112 to provide new access-control information about computing device 210 to control subsystem 250 (e.g., network 240 may inform control subsystem 250 that computing device 210 is no longer compliant with network security policies). Control subsystem 250 may distribute the access-control information received from network 240 to other associated networks (e.g., other networks in an enterprise).

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, assigning, receiving, using, determining, distributing, accessing, terminating steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, assigning, receiving, using, determining, distributing, accessing, and terminating.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for identifying, assigning, receiving, using, determining, distributing, accessing, terminating steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, assigning, receiving, using, determining, distributing, accessing, terminating steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, assigning, receiving, using, determining, distributing, accessing, terminating steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Storage devices 532 and 533 may also be used, for example, to perform and/or be a means for performing, either alone or in combination with other elements, one or more of the identifying, identifying, assigning, receiving, using, determining, distributing, accessing, terminating steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, assigning, receiving, using, determining, distributing, accessing, terminating steps disclosed herein. Network architecture 600 may also be used to perform and/or be a means for performing other steps and features set forth in the instant disclosure.

As detailed above, computing system 510 and/or one or more of components of network architecture 600 may perform and/or be a means for performing, either alone or in combination with other elements, one or more steps of the exemplary methods described and/or illustrated herein. For example, a computing system (e.g., computing system 510 and/or one or more of the components of network architecture 600) may perform a computer-implemented method for providing transport-agnostic network access control. For example, the computing system may assign a transport-agnostic identifier to a computing device. The computing system may identify a first attempt by the computing device to access a first network. The first attempt may be made via a first media-transport technology that may identify the computing device with a first transport-specific identifier. The computing system may also receive the transport-agnostic identifier from the computing device. The computing system may use the transport-agnostic identifier, instead of the first transport-specific identifier, to determine whether to allow the computing device to access the first network.

In some embodiments, the computing system may identify a second attempt by the computing device to access the first network. The second attempt may be made via a second media-transport technology that may identify the computing device with a second transport-specific identifier. The computing system may receive the transport-agnostic identifier from the computing device. The computing system may further use the transport-agnostic identifier, instead of the second transport-specific identifier, to determine whether to allow the computing device to access the first network.

In some embodiments, the first media-transport technology may comprise a wired-network technology and the second media-transport technology may comprise a wireless-network technology. In various embodiments, the computing system may receive access-control information associated with the transport-agnostic identifier from the first network and may distribute the access-control information to a second network.

In some embodiments, the computer system may send the transport-agnostic identifier to the computing device. The transport-agnostic identifier may be assigned and sent to the computing device during an initiation process that is performed prior to allowing the computing device to access the first network. According to at least one embodiment, the transport-agnostic identifier may comprise a globally unique identifier.

In various embodiments, using the transport-agnostic identifier to determine whether to allow the computing device to access the first network may comprise determining whether the transport-agnostic identifier is listed on a black list or a white list. In certain embodiments, using the transport-agnostic identifier to determine whether to allow the computing device to access the first network may include determining that the computing device is not allowed to access the first network and terminating network connectivity for the computing device.

In some embodiments, a system may include a control module. The control module may assign a transport-agnostic identifier to a computing device. The control module may identify a first attempt by the computing device to access a first network. The first attempt may be made via a first media-transport technology. The first media-transport technology may identify the computing device with a first transport-specific identifier. The control module may also receive the transport-agnostic identifier from the computing device and may use access-control information associated with the transport-agnostic identifier, rather than the first transport-specific identifier, to determine whether to allow the computing device to access the first network. The system may also include a processor configured to execute the control module. The system may further include a database configured to store the access-control information and the transport-agnostic identifier.

In at least one embodiment, the control module may identify a second attempt by the computing device to access the first network. The second attempt may be made via a second media-transport technology that may identify the computing device with a second transport-specific identifier. The control module may receive the transport-agnostic identifier from the computing device and may use the transport-agnostic identifier, rather than the second transport-specific identifier, to determine whether to allow the computing device to access the first network.

In some embodiments, the first media-transport technology may comprise a wired-network technology and the second media-transport technology may comprise a wireless-network technology. In other embodiments, the control module may receive access-control information associated with the transport-agnostic identifier from the first network and may distribute the access-control information to a second network.

In at least one embodiment, the control module may send the transport-agnostic identifier to the computing device. The transport-agnostic identifier may be assigned and sent to the computing device during an initiation process that is performed prior to allowing the computing device to access the first network. In some embodiments, the transport-agnostic identifier may comprise a globally unique identifier. In other embodiments, the control module may determine whether the transport-agnostic identifier is listed on a black list or a white list. In various embodiments, the control module may determine that the computing device is not allowed to access the first network and may terminate network connectivity for the computing device. In at least one embodiment, the system may comprise a submission module located on the computing device. The submission module may submit the transport-agnostic identifier to the control module during the first attempt to access the first network.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method comprising:
assigning, at a server-side network-access-control computing system, a transport-agnostic identifier to a client-side computing device, the transport-agnostic identifier being configured to uniquely identify the client-side computing device regardless of the media-transport technologies used by the client-side computing device to access a first network;
associating the transport-agnostic identifier with access-control information stored at the server-side network-access-control computing system that is indicative of whether the client-side computing device is compliant with an access-control policy;
identifying, at the server-side network-access-control computing system, a first attempt by the client-side computing device to access the first network, the first attempt being made via a first media-transport technology that identifies the client-side computing device with a first transport-specific identifier;
receiving, at the server-side network-access-control computing system, the transport-agnostic identifier from the client-side computing device;
using, at the server-side network-access-control computing system, the transport-agnostic identifier, instead of the first transport-specific identifier, to determine whether to allow the client-side computing device to access the first network, wherein:
determining whether to allow the client-side computing device to access the first network comprises:
using the transport-agnostic identifier to retrieve the access-control information stored at the server-side network-access-control computing system;
determining, based on the access-control information, whether the client-side computing device is compliant with the access-control policy;
identifying, at the server-side network-access-control computing system, a second attempt by the client-side computing device to access the first network, the second attempt being made via a second media-transport technology that identifies the client-side computing device with a second transport-specific identifier that is different than the first transport-specific identifier;
re-receiving, at the server-side network-access-control computing system, the transport-agnostic identifier from the client-side computing device;
using, at the server-side network-access-control computing system, the transport-agnostic identifier, instead of the second transport-specific identifier, to determine whether to allow the client-side computing device to access the first network.

2. The computer-implemented method of claim 1, wherein the transport-agnostic identifier is configured to identify the computing device when the first transport-specific identifier and the second transport-specific identifier are different.

3. The computer-implemented method of claim 1, wherein the first media-transport technology and the second media-transport technology are different.

4. The computer-implemented method of claim 1, further comprising:

receiving the access-control information associated with the transport-agnostic identifier from the first network;
distributing the access-control information to a second network, wherein the receiving the access-control information and the distributing are performed by the server-side network-access-control computing system.

5. The computer-implemented method of claim 1, further comprising sending the transport-agnostic identifier to the client-side computing device, wherein the transport-agnostic identifier is assigned and sent to the client-side computing device during an initiation process that is performed prior to allowing the client-side computing device to access the first network, wherein the sending is performed by the server-side network-access-control computing system.

6. The computer-implemented method of claim 1, wherein the transport-agnostic identifier comprises a globally unique identifier.

7. The computer-implemented method of claim 1, wherein the first transport-specific identifier is not available to the server-side network-access-control computing system when the client-side computing device attempts to access the first network via the second media-transport technology.

8. The computer-implemented method of claim 1, further comprising:
  monitoring, while the client-side computing device is accessing the first network, whether the client-side computing device is compliant with the access-control policy;
  determining, while monitoring whether the client-side computing device is compliant with the access-control policy, that the client-side computing device is no longer compliant with the access-control policy;
  updating, in response to determining that the client-side computing device is no longer compliant with the access-control policy, the access-control information associated with the transport-agnostic identifier to indicate that the client-side computing device is no longer compliant with the access-control policy;
  receiving the updated access-control information associated with the transport-agnostic identifier from the first network;
  distributing the updated access-control information to a second network, wherein the receiving the updated access-control information and the distributing are performed by the server-side network-access-control computing system.

9. A system comprising:
  a control module programmed to:
    assign, at a server-side network-access-control computing system, a transport-agnostic identifier to a client-side computing device, the transport-agnostic identifier being configured to uniquely identify the client-side computing device regardless of the media-transport technologies used by the client-side computing device to access a first network;
    associate the transport-agnostic identifier with access-control information stored at the server-side network-access-control computing system that is indicative of whether the client-side computing device is compliant with an access-control policy;
    identify, at the server-side network-access-control computing system, a first attempt by the client-side computing device to access the first network, the first attempt being made via a first media-transport technology that identifies the client-side computing device with a first transport-specific identifier;
    receive, at the server-side network-access-control computing system, the transport-agnostic identifier from the client-side computing device;
    use, at the server-side network-access-control computing system, the transport-agnostic identifier, rather than the first transport-specific identifier, to determine whether to allow the client-side computing device to access the first network, wherein determining whether to allow the client-side computing device to access the first network comprises:
      using the transport-agnostic identifier to retrieve the access-control information stored at the server-side network-access-control computing system;
      determining, based on the access-control information, whether the client-side computing device is compliant with the access-control policy;
    identify, at the server-side network-access-control computing system, a second attempt by the client-side computing device to access the first network, the second attempt being made via a second media-transport technology that identifies the client-side computing device with a second transport-specific identifier that is different than the first transport-specific identifier;
    re-receive, at the server-side network-access-control computing system, the transport-agnostic identifier from the client-side computing device;
    use, at the server-side network-access-control computing system, the transport-agnostic identifier, rather than the second transport-specific identifier, to determine whether to allow the client-side computing device to access the first network;
  one or more hardware processors configured to execute the control module;
  one or more databases configured to store the access-control information and the transport-agnostic identifier.

10. The system of claim 9, wherein
the transport-agnostic identifier is configured to identify the computing device when the first transport-specific identifier and the second transport-specific identifier are different.

11. The system of claim 9, wherein the first media-transport technology and the second media-transport technology are different.

12. The system of claim 9, wherein the control module is further programmed to:
  receive the access-control information associated with the transport-agnostic identifier from the first network;
  distribute the access-control information to a second network.

13. The system of claim 9, wherein:
  the control module is further programmed to send the transport-agnostic identifier to the client-side computing device;
  the transport-agnostic identifier is assigned and sent to the client-side computing device during an initiation process that is performed prior to allowing the client-side computing device to access the first network.

14. The system of claim 9, wherein the transport-agnostic identifier comprises a globally unique identifier.

15. The system of claim 9, wherein the first transport-specific identifier is not available when the client-side computing device attempts to access the first network via the second media-transport technology.

16. The system of claim 9, wherein the control module is further programmed to:

monitor, while the client-side computing device is accessing the first network, whether the client-side computing device is compliant with the access-control policy;

determine, while monitoring whether the client-side computing device is compliant with the access-control policy, that the client-side computing device is no longer compliant with the access-control policy;

update, in response to determining that the client-side computing device is no longer compliant with the access-control policy, the access-control information associated with the transport-agnostic identifier to indicate that the client-side computing device is no longer compliant with the access-control policy;

receive the updated access-control information associated with the transport-agnostic identifier from the first network;

distribute the updated access-control information to a second network.

17. The system of claim 9, further comprising a submission module located on the client-side computing device and programmed to submit the transport-agnostic identifier to the control module during the first attempt to access the first network and the second attempt to access the first network.

18. A non-transitory computer-readable-storage medium comprising one or more computer-executable instructions that, when executed by a client-side computing device, cause the client-side computing device to:

assign, at a server-side network-access-control computing system, a transport-agnostic identifier to a remote client-side computing device, the transport-agnostic identifier being configured to uniquely identify the remote client-side computing device regardless of the media-transport technologies used by the remote client-side computing device to access a first network;

associate the transport-agnostic identifier with access-control information stored at the server-side network-access-control computing system that is indicative of whether the remote client-side computing device is compliant with an access-control policy;

identify, at the server-side network-access-control computing system, a first attempt by the remote client-side computing device to access the first network, the first attempt being made via a first media-transport technology that identifies the remote client-side computing device with a first transport-specific identifier;

receive, at the server-side network-access-control computing system, the transport-agnostic identifier from the remote client-side computing device;

use, at the server-side network-access-control computing system, the transport-agnostic identifier, instead of the first transport-specific identifier, to determine whether to allow the remote client-side computing device to access the first network, wherein determining whether to allow the remote client-side computing device to access the first network comprises:

using the transport-agnostic identifier to retrieve the access-control information stored at the server-side network-access-control computing system;

determining, based on the access-control information, whether the remote client-side computing device is compliant with the access-control policy;

identify, at the server-side network-access-control computing system, a second attempt by the remote client-side computing device to access the first network, the second attempt being made via a second media-transport technology that identifies the remote client-side computing device with a second transport-specific identifier that is different than the first transport-specific identifier;

re-receive, at the server-side network-access-control computing system, the transport-agnostic identifier from the remote client-side computing device;

use, at the server-side network-access-control computing system, the transport-agnostic identifier, instead of the second transport-specific identifier, to determine whether to allow the remote client-side computing device to access the first network.

19. The non-transitory computer-readable-storage medium of claim 18, wherein
the transport-agnostic identifier is configured to identify the remote computing device when the first transport-specific identifier and the second transport-specific identifier are different.

20. The non-transitory computer-readable-storage medium of claim 18, wherein the first media-transport technology and the second media-transport technology are different.

* * * * *